US008241005B2

(12) United States Patent
Emmerson et al.

(10) Patent No.: US 8,241,005 B2
(45) Date of Patent: Aug. 14, 2012

(54) GAS TURBINE ENGINE CENTRIFUGAL IMPELLER

(75) Inventors: Calvin W. Emmerson, San Diego, CA (US); Robert A. Ress, Jr., Carmel, IN (US); Stephen N. Hammond, Brownsburg, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 911 days.

(21) Appl. No.: 12/288,053

(22) Filed: Oct. 16, 2008

(65) Prior Publication Data

US 2010/0098546 A1    Apr. 22, 2010

(51) Int. Cl.
*B64C 11/24* (2006.01)
*F01D 5/18* (2006.01)

(52) U.S. Cl. .............. 416/233; 416/236 R; 415/106; 415/115

(58) Field of Classification Search ............ 416/181, 416/182, 185, 232, 233, 196 R, 195; 415/106, 415/115; 29/889, 889.4
See application file for complete search history.

(56) References Cited

U.S. PATENT DOCUMENTS

| 4,787,821 | A | * | 11/1988 | Cruse et al. ............ 416/185 |
|---|---|---|---|---|
| 5,671,533 | A | | 9/1997 | Dillamore et al. |
| 6,754,954 | B1 | | 6/2004 | Decker |
| 6,945,748 | B2 | | 9/2005 | Svihla et al. |
| 2001/0001897 | A1 | | 5/2001 | Zhao et al. |
| 2005/0091848 | A1 | | 5/2005 | Nenov et al. |
| 2005/0111971 | A1 | | 5/2005 | Fukizawa et al. |
| 2006/0034695 | A1 | | 2/2006 | Hall et al. |
| 2007/0029365 | A1 | * | 2/2007 | Paul et al. .............. 228/101 |
| 2011/0129068 | A1 | * | 6/2011 | Lewalter et al. ......... 378/127 |

* cited by examiner

*Primary Examiner* — David Nhu
(74) *Attorney, Agent, or Firm* — Krieg DeVault LLP

(57) ABSTRACT

In one embodiment a centrifugal impeller has an axis of rotation, a plurality of blades, and a plurality of pitches defined between the blades. A cavity may be formed in a back side of the impeller, opposite with at least one of the plurality of pitches. In one form the cavity may not extend below a radius determined according to a stress criteria or stress limitation.

22 Claims, 6 Drawing Sheets

GAS TURBINE ENGINE CENTRIFUGAL IMPELLER

FIELD OF THE INVENTION

The present invention generally relates to impellers, and more particularly, but not exclusively, to impellers for centrifugal compressors utilized in gas turbine engines.

BACKGROUND

Impeller efficiency and/or performance may be influenced by many factors such as, but not limited to, the shape of the flow path, the shape of the blades, the materials used and the design of interfacing components. The operational tip speed at which the impeller is rotated may also influence efficiency and/or performance. Some existing systems have various shortcomings relative to certain applications. Accordingly, there remains a need for further contributions in this area of technology.

SUMMARY

One embodiment of the present invention is a unique gas turbine engine centrifugal compressor impeller. Other embodiments include apparatuses, systems, devices, hardware, methods, and combinations for improving the capabilities of impellers. Further embodiments, forms, features, aspects, benefits, and advantages of the present application shall become apparent from the description and figures provided herewith.

DETAILED DESCRIPTION OF REPRESENTATIVE EMBODIMENTS

Figure 1:
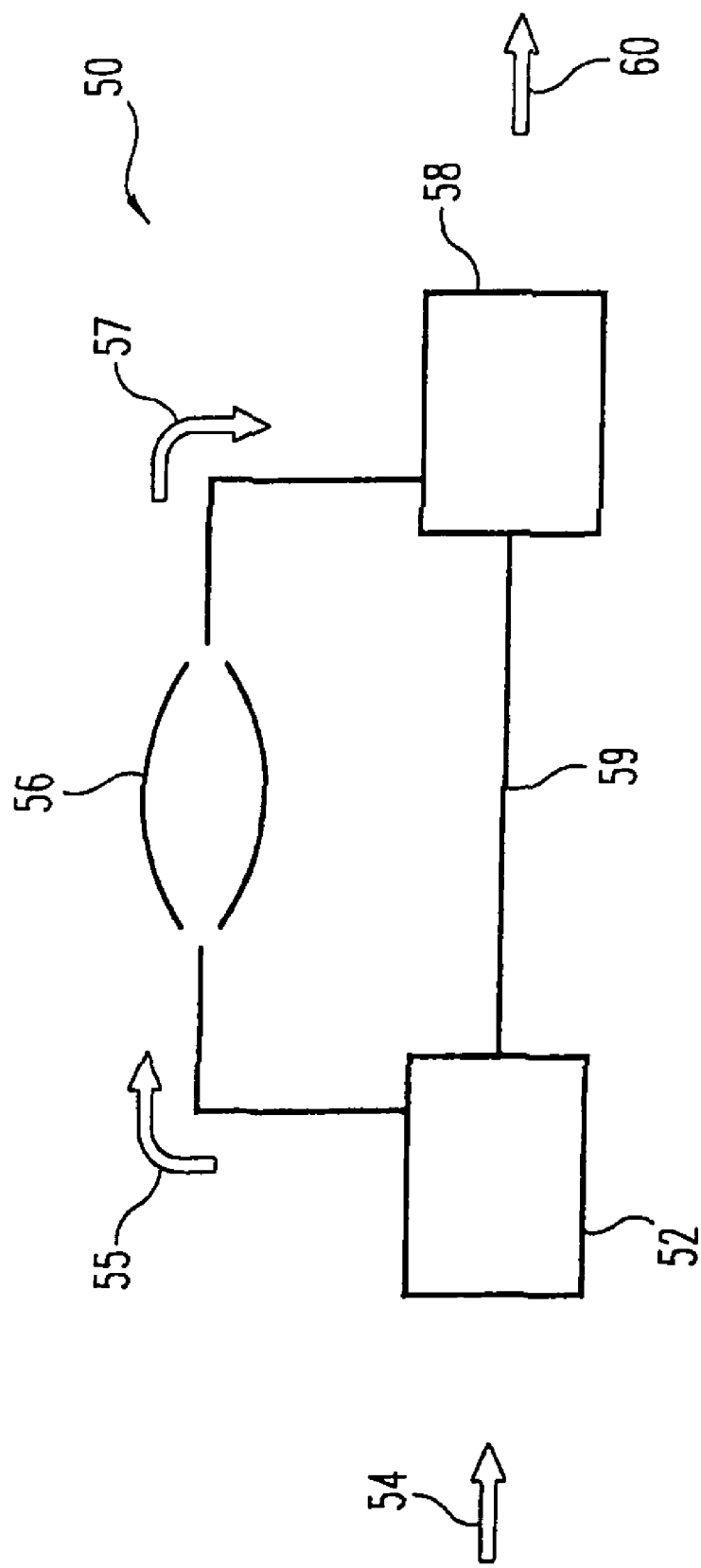
FIG. 1 is a schematic of a gas turbine engine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, one form of a gas turbine engine 50 is disclosed having a centrifugal compressor 52 that is operable to compress airflow 54 and deliver a compressed stream 55 to a combustor 56. Fuel is added to the compressed stream 55 and is burned in the combustor 56 before being delivered to a turbine 58 which extracts energy from a burned fuel/air mixture 57. The energy extracted by the turbine 58 may be used to drive various components and systems including the compressor 52 through a shaft 59. An exhaust stream 60 exits the gas turbine engine 50 after passing through the turbine 58. The gas turbine engine 50 may be configured as a turboshaft engine, a turboprop engine, or any other type of gas turbine engine suitable for use as an aircraft power plant. The term "aircraft" includes, but is not limited to, helicopters, airplanes, unmanned aerospace vehicles, fixed wing vehicles, variable wing vehicles, rotary wing vehicles, tilt-wing vehicles, tilt-rotor vehicles, hover crafts, and others. Further, the present inventions are contemplated for utilization in other applications that may not be coupled with an aircraft such as, for example, industrial applications, power generation, pumping sets, naval propulsion, and other applications known to one of ordinary skill in the art. Though the gas turbine engine 50 is depicted as including only a centrifugal compressor, other embodiments contemplated herein may include gas turbine engines having a compressor that includes centrifugal and axial compressor sections.

Figure 2:
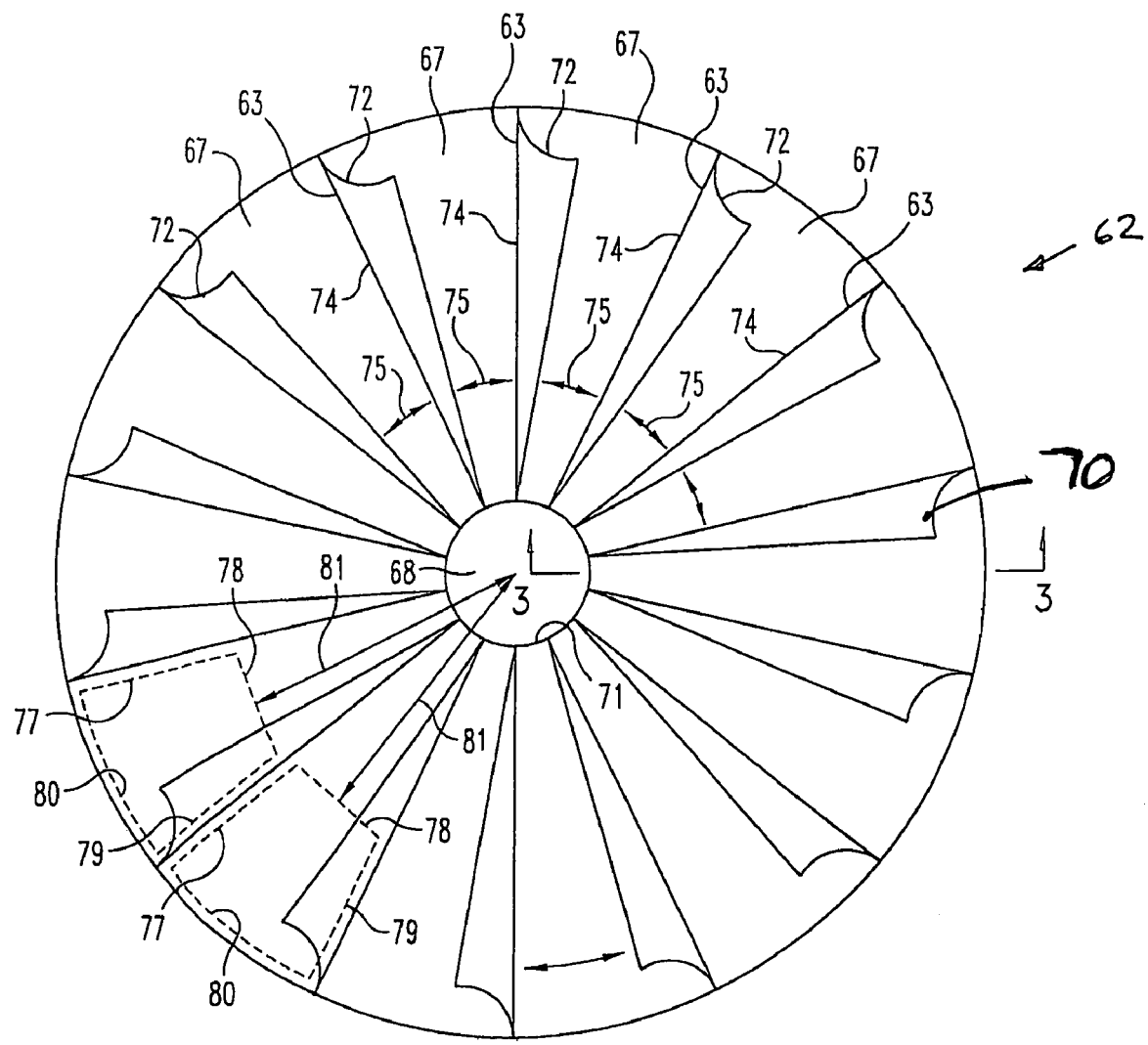
FIG. 2 is a front view of one embodiment of an impeller.

FIG. 2 depicts a top view of an impeller 62 which may be used within the centrifugal compressor 52. In some applications, the impeller 62 may be used elsewhere such as, but not limited to, the turbine 58. In one form the impeller 62 includes a hub region 68, a tip region 70, blades 74, and an inducer 72. The impeller 62 may further include a cavity 76 (FIG. 3) and a backplate 86 (FIG. 3) as will be described further hereinbelow. The inducer 72 and blades 74 act to pull the airflow 54 in to the centrifugal compressor 52 and accelerate and/or pressurize the airflow 54. The inducer 72 may be located on each blade 74 of the illustrative embodiment, but in alternative embodiments some or all blades 74 may not include the inducer 72. In other embodiments, one or more of the inducers 72 may be physically distinct from the blades 74. In one non-limiting example, a series of inducers 72 which only partially extend between the hub region 68 and the tip region 70 may be provided upstream of the blades 74. Other variations of the blades 74 and/or the inducers 72 are also contemplated herein.

Figure 3:
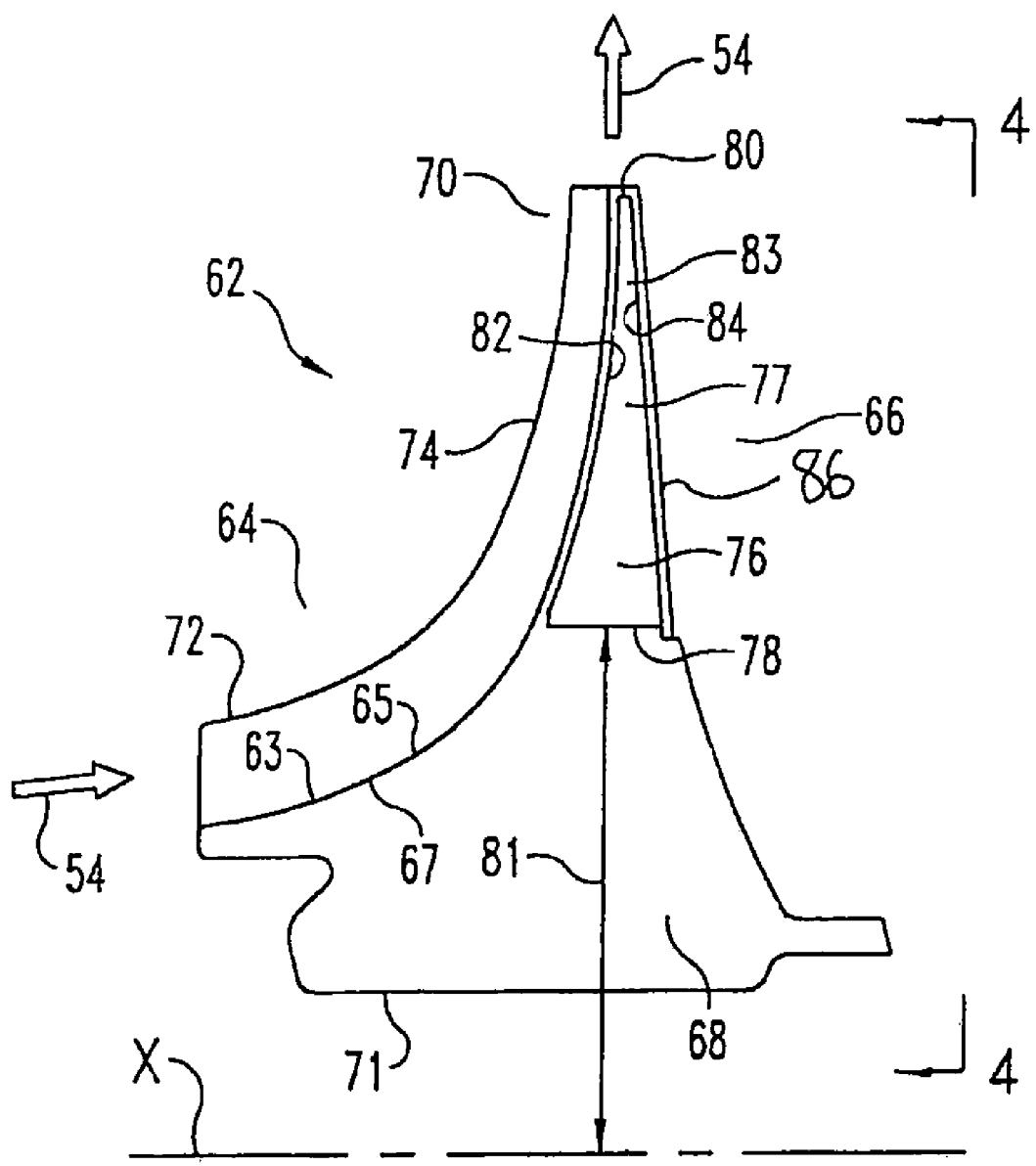
FIG. 3 is a view along line 3-3 of FIG. 2

FIG. 3 depicts a partial side view of the impeller 62 of the centrifugal compressor 52 along line 3-3 in FIG. 2. The impeller 62 is operable to rotate about an axis X and may be rotated at a variety of angular velocities. The airflow 54 enters the impeller 62 on the front side 64 near the hub region 68 and exits near the tip region 70 of the front side 64. As used herein, the term "hub region" refers to the area of the impeller 62 near the axis of rotation X. Also as used herein, the term "tip region" refers to the area of the impeller 62 furthest from the axis of rotation X. Some embodiments of a centrifugal compressor may have a diffuser or other structure located upstream of the impeller 62 such that the airflow 54 may be decelerated or otherwise conditioned prior to entering the impeller 62. In addition, the airflow 54 exiting the impeller 62 may traverse a diffuser or other structure to further decelerate and/or condition the airflow 54 prior to entering the combustor 56.

Referring now to FIGS. 2 and 3 with continuing reference to FIG. 1, a number of blades 74 may be disposed around the impeller 62 and may be separated by a pitch 75 characterized as the area between the blades 74. The pitch 75 may have a surface perpendicular to the axis of rotation X or may be curved along a surface 67 of the impeller 62. In some embodiments, the pitch 75 may be substantially flat. The blades 74 may be spaced any given distance apart such that the pitch 75 may take on various forms in different embodiments. Though the blades 74 are depicted as being equiangularly distributed about the impeller 62 such that the pitch 75 between the blades 74 is substantially the same, some alternative embodiments may contain blades 74 that are not equiangularly distributed. Each of the blades 74 of the illustrative embodiment are full blades, but in other embodiments some blades 74 of the impeller 62 may be other types of blades, such as, but not limited to, splitter blades.

The blades 74 include a root contour 63 that may be seen in FIG. 2 as generally extending in a radially straight line from the hub region 68 to the tip region 70. As used herein, the term "root contour" includes the area traced by the root 65 of the blade 74 on the surface 67 of the impeller 62. Some embodiments may include blades 74 having a back sweep or a forward sweep. In still further embodiments, some blades 74 may have a lean angle, a twist angle, and/or a rake angle. The blades 74 may have other geometric characteristics in other embodiments. Although the blades 74 in the illustrative embodiment extend from the hub region 68 to the tip region 70, some embodiments may include blades 74 that only partially extend between the hub and the tip.

The backplate 86 may be provided to cover the cavity 76 and may be attached to the impeller 62. In some embodiments, the backplate 86 may be integrally formed with the impeller 62 by such techniques as investment casting or diffusion bonding, to set forth just a few non-limiting examples. The backplate 86 may reduce windage drag in the impeller 62 as it is rotated in operation.

The cavity 76 is located toward the back side 66 of the impeller and may occupy a space opposite the pitch 75 between the blades 74 on the front side 64 of the impeller 62. The cavity 76 may be formed by machining and/or investment casting, to set forth just a few non-limiting examples. Cavities 76 that are formed in spaces opposite the pitch 75 of the impeller 62 may permit increases in the tip speed of the impeller without violating a defined stress value, or a stress limitation, at the bore 71 of the impeller 62. The stress value or limit may be determined given the expected operational temperature, expected rotational speed, and/or expected material type used in the impeller, among other considerations. In some embodiments, it is estimated that increases in tip speed of 10% may be achievable. Other embodiments may provide greater or lesser increases in tip speed. The cavity or cavities 76 formed in the impeller 62 may also provide for the introduction of flow control within or through the impeller 62. To set forth just one non-limiting example, introducing flow control may allow a separated boundary layer to be bled off into the cavity 76, or it may allow for the injection of fluid flow from the cavity 76 to a flow path external to the impeller 62 to prevent flow separation. In some embodiments, the cavity 76 may be partially or completely filled with a material, which may or may not be relatively light, such that the cavity is not a complete void. Various materials could be chosen to fill the cavity 76. To set forth just one non-limiting example, the material filling the cavity 76 may be porous.

The cavity 76 may have boundaries generally defined by a hub end 78, a tip end 80, a front end 82, a back end 84, a border 77, and a border 79. Although depicted in the illustrative embodiment as having been formed near the back side 66 of the impeller 62, some embodiments of the cavity 76 may be located more toward the front side 64.

The cavity boundaries may be used to fully define a cavity, or the boundaries may be used to define a viable location or space for one or more cavities. In one non-limiting example, one or more cavities may be located within the space defined by the hub end 78, the tip end 80, the front end 82, the back end 84, the border 77, and the border 79. For this reason it may be convenient to designate a "candidate cavity space" that may be defined by all aforementioned boundaries, or alternatively a subset of such boundaries. In one non-limiting example, a candidate cavity space may be defined according to the boundaries seen in FIGS. 2 and 3 i.e. the hub end 78, the tip end 80, the border 77, the border 79, the front end 82, and the back end 84. Accordingly, any discussion herein regarding the boundaries of the cavity 76 may apply equally to the candidate cavity space.

Any number of cavities 76 may be provided in the impeller 62. Two cavities 76 are depicted in dashed line in FIG. 2 opposite two of the pitches 75, but it will be understood that a cavity 76 may be formed in the impeller 62 opposite each pitch 75 between all blades 74. In some alternative embodiments, a cavity 76 may span several blades. In some alternative embodiments, the cavities 76 may be formed opposite every other pitch 75, or perhaps every third pitch, among other possible variations. Furthermore, the existence of the cavities 76 on the back side 66 of the impeller 62 need not be symmetrically distributed. Counterweighting may be needed to balance the impeller 62 having an asymmetric distribution of the cavities 76. In some embodiments, multiple cavities may be defined within a candidate cavity space defined opposite a single pitch 75. To set forth one non-limiting example, multiple holes may be drilled or otherwise formed within the candidate cavity space defined by boundaries including the hub end 78, the tip end 80, the border 77, and the border 79. The holes in this embodiment may be distributed randomly throughout the space or may be arranged along a predefined pattern. To set forth just one non-limiting example, the candidate cavity space may have holes formed and distributed along an involute of a circle. Other examples may include holes staggered in the candidate cavity space along multiple involutes of a circle.

The hub end 78 of the cavity 76 is set a radial distance 81 away from the rotational axis X. The radial distance 81 which determines the hub end 78 may be calculated by equation (1) set forth directly below.

$$s=(\rho \cdot r^2 \cdot \omega^2)/386.4 \qquad (1)$$

where s is a stress value or limitation as discussed above, $\rho$ is density, r is the radial distance, or radius, to be determined, and $\omega$ is angular velocity. The constant 386.4 is included to permit the density term ($\rho$), the radius term (r), and the speed term ($\omega$) to be expressed using English units of $lb_m/in^{}3$, in, and radians/second respectively. Using the constant 386.4 results in the stress term having the units $lb_f/in^{}2$. In some applications, the constant 386.4 may have a different value if the variables in equation (1) are expressed in different units, for example, SI. Equation (1) relates to a uniform circular ring having a thickness in the plane of curvature that is very small compared with r.

The radius at which the stress value s is equal to 0.95 (0.2% YS) for the material of choice is the "free ring radius." This term defines the largest radius at which the thin ring will be self-sustaining. At higher radii, the ring would yield and go to destruction at the selected operating rotational speed. In general, material that is higher in radius r is also closer to the yield strength of the material.

The circumferential contour of the hub end 78 may follow the radial distance 81 solved by the equation (1), or it may have some other shape. To set forth just one non-limiting example, the circumferential contour of the hub end 78 may depend on a detailed finite element analysis that takes into account the three dimensional nature of the state of stress in the hub of the impeller. In those situations where the hub end 78 does not circumferentially follow the radial distance 81 solved by the equation (1), the radially innermost point of the hub end 78 may be defined by the equation (1). For example, if the hub end 78 is rounded as may be seen in FIG. 4 (to be discussed below) then the radially innermost point of the hub end 78 may be defined by equation (1). The hub end 78 may have more than one point as the radially innermost point. For example, if the hub end 78 were shaped similar to a sinusoid then the peaks of the sinusoid may correspond with the radial distance 81 found using equation (1). Depending on the particular application, different relations and/or constraints other than equation (1) might be used to define the radial distance 81, and thus the radially innermost points, of hub end 78.

The tip end 80 denotes the radially outer end of the cavity 76. The tip end 80 may be formed such that the cavity 76 opens to the surrounding environment, or it may be formed just short of that such that a closed cavity is formed. Though the tip end is depicted in FIG. 3 as following the circumferential contour of the impeller 62, the tip end 80 may take on any other forms as well. To set forth a few non-limiting examples, the tip end 80 may be formed like the tip of a triangle, it may be semicircular, it may be sinusoid, or it may be some other shape depending on the particular application and requirements.

The front end 82 defines the depth of the cavity 76 relative to the back end 84 and may be formed to any depth. The front end 82 is depicted in FIG. 3 as generally following a contour similar to the surface 67 of the impeller 62, but in other embodiments it may be substantially planar, it may follow another contour altogether, and/or it may be substantially parallel with the back end 84, to set forth just a few non-limiting examples.

The back end 84 is defined by the backplate 86 and is substantially planar in the illustrative embodiment. Other embodiments, however, may include the back end 84 having a non-planar surface.

The border 77 and the border 79 may follow the root contour 63 of the blade 74 as may be seen in FIG. 2. In other embodiments, however, either or both the border 77 and the border 79 may follow a path separate and distinct from the blades 74. For example, the border 77 may be triangular shaped or curved from the tip end 80 to the hub end 78. Other shapes and paths are also contemplated herein.

Figure 4:
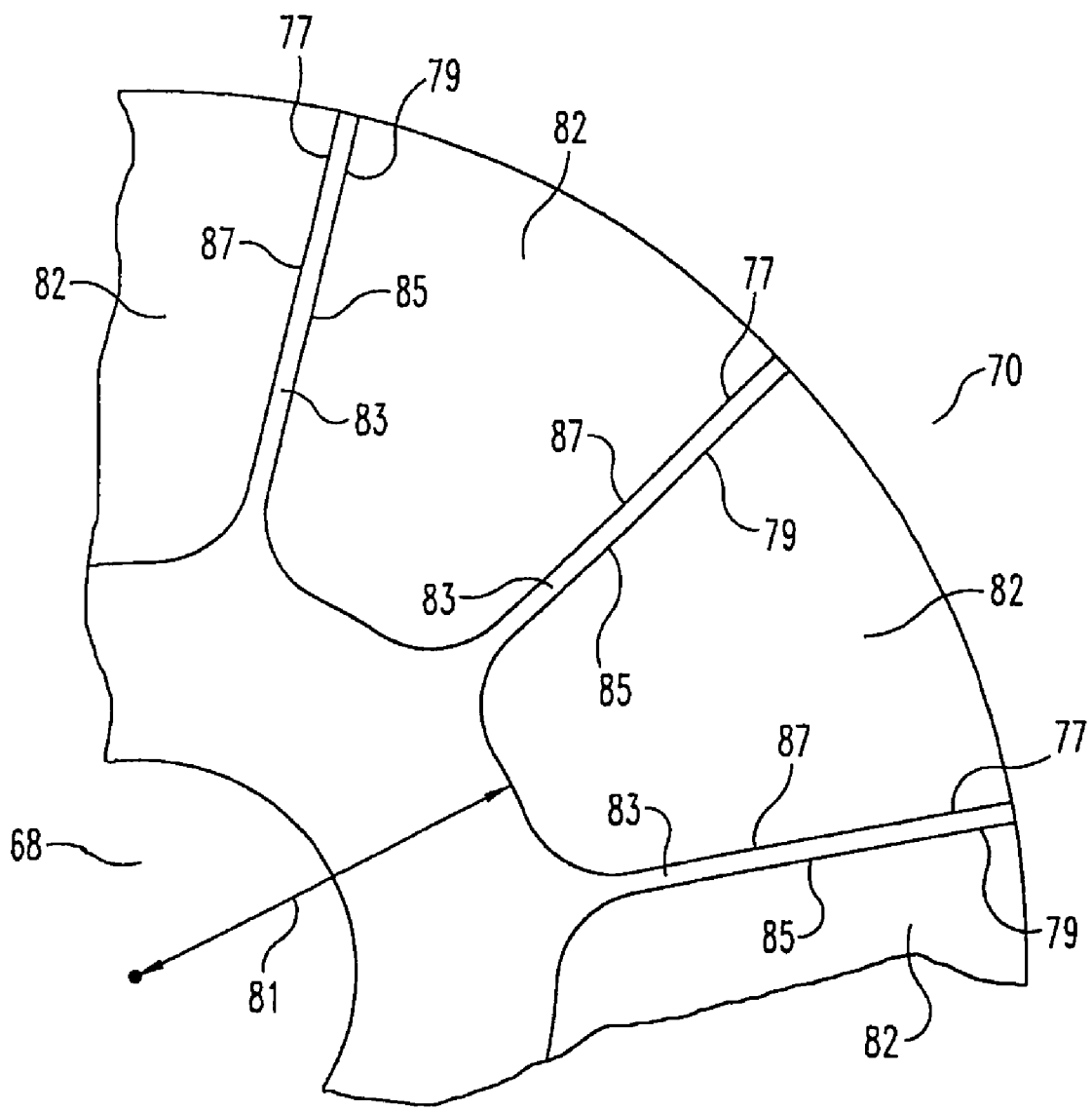
FIG. 4 is a partial view along line 4-4 of FIG. 3.

Turning to FIG. 4, with continuing reference to FIG. 3, a view of the back side 66 of the impeller 62 is depicted along line 4-4 of FIG. 3. For the purposes of this view, the backplate 86 is not depicted. Ribs 83 extend along their length from the hub region 68 to the tip region 70 and may follow the root contour 63 of the blades 74 on the front side 64 of the impeller 62. The ribs 83 may have a variety of widths depending on the size of the cavity 76. The ribs 83 have a height between the front end 82 and the back end 84. In the illustrative embodiment, walls 85 and 87 of the ribs 83 correspond to the border 79 and the border 77, respectively. The backplate 86 engages each rib 83 of the illustrative embodiment, but in some embodiments may only engage selected ribs 83. In addition, some embodiments may include ribs 83 that only partially extend from the front side 64 to the back side 66. When the backplate 86 is either attached or formed with the impeller 62, the cavity 76 may be a sealed area.

As will be appreciated given the description herein of various aspects of the impeller 62, some embodiments of the cavity 76 may not be a sealed area. For example, some embodiments may include one or more ribs having holes, openings, slots, or other voids, such that fluid may be transferred from one cavity to the next. These holes, openings, slots, or other voids may be formed in the ribs 83 or may be formed in the backplate, or both. In some embodiments, when a backplate encloses the cavity, the rib 83 may not meet entirely with the backplate such that an opening is formed. This opening may be over a portion of the length of the rib or over the entire length. In this way air may be allowed to pass from a cavity on one side of a rib to a cavity on the other side of the rib. Ribs need not be opposite with each and every blade. Ribs may be absent on some blades, or partially absent along a length of the root contour.

Figure 5:
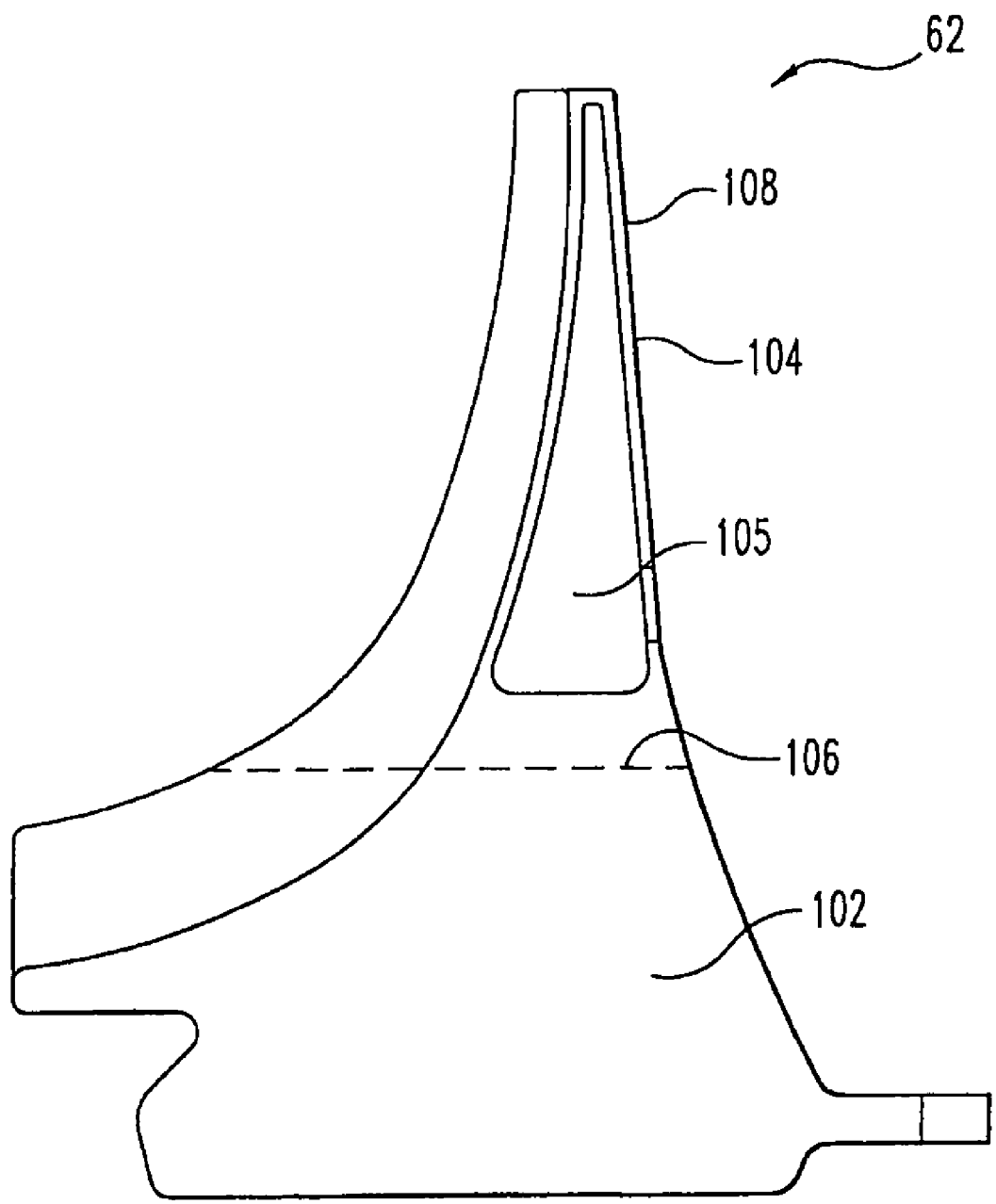
FIG. 5 is a partial cross-sectional view of an embodiment of a dual alloy impeller.

Turning now to FIG. 5, an embodiment of the impeller 62 is shown having been constructed through diffusion bonding. The impeller 62 includes a hub 102 and a tip 104, both of which are constructed from different materials and which, after bonding, may form a dual alloy impeller 62. A diffusion bond line 106 is depicted as separating the hub 102 and the tip 104. In some embodiments, the diffusion bond line 106 may be a cylindrical surface or line of demarcation between the hub 102 and the tip 104 as shown in FIG. 5. In other embodiments, the diffusion bond line 106 may be conical in form or some other shape or combination of shapes to permit, among other possibilities, optimization of the bonding process. In some embodiments, the impeller 62 may be made of multiple different pieces other than just a hub 102 and a tip 104. In these embodiments, all of the multiple pieces, or just a subset, may be diffusion bonded. In one embodiment, the hub 102 may be formed from titanium, such as Ti6-2-4-6 or Orthorhombic Titanium having a low density and a high modulus of elasticity. The tip 104 may be formed from titanium alloy, such as non-burning TiAl with a low density and a high modulus of elasticity. The two sections 102 and 104 may be diffusion bonded through a differential thermal expansion approach utilizing for example TZM moly backup rings. In one application, the hub 102 and tip 104 and the TZM moly backup rings may be heated together in a vacuum of $1 \times 10^{-4}$ Torr or lower. During the bonding process, the backup ring on the outside of the assembly will expand less than the hub 102 and tip 104 which will apply a forge on the joint between the two. The bonding assembly includes the hub 102, tip 104 and backup rings can be heated to a range above 1650° F. and below the Ti6-2-4-6 beta transus temperature, which is 1730° F., and held at that temperature for diffusion to occur. The time period at which the temperature may be held may be in the range of 8 to 24 hours. In some embodiments, a preferred bonding temperature is close to the beta transus temperature without going over that temperature where transformation would occur. A releasing agent may be applied on the contact surface between the backup rings and the tip 104. After the hub 102 and tip 104 have been bonded, the assembly can be cooled and disassembled. In some embodiments, the bonded hub 102 and tip 104 are solution heat treated to below the beta transus temperature of 1730° F. and quickly cooled to room temperature, and then be followed by a precipitation heat treatment at 1100° F. for 8 hours. In some applications, a pure Titanium coating or TiCuNi foil could be placed at the joint interface to activate bonding. Other techniques and parameters for bonding the components together are contemplated herein.

Before the hub 102 and the tip 104 may be diffusion bonded, the tip 104 may be cast having a hollow space 105 with an integral backplate 108. The hollow space 105 may be formed similar to any of the embodiments or variations of the cavities disclosed above. A dual alloy impeller 62 having a hollow space 105 may be able to achieve higher tip speeds than a single composition impeller 62 with a cavity as described above.

Figure 6A:
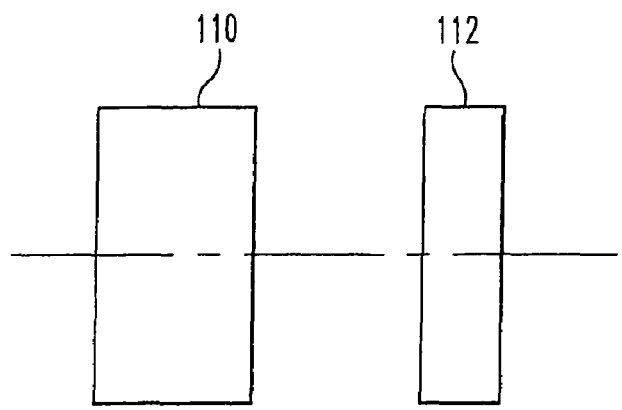
FIGS. 6a, 6b, and 6c depict a method of making one embodiment of an impeller.
Figure 6B:
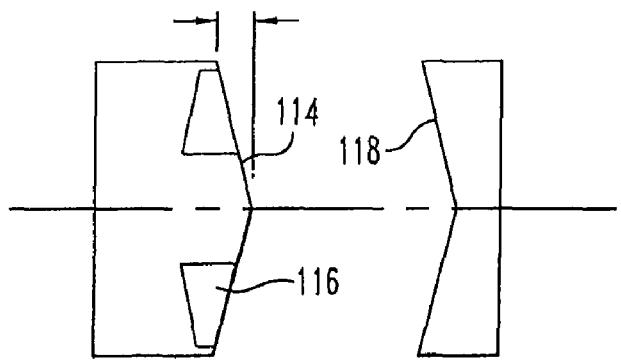
Figure 6C:
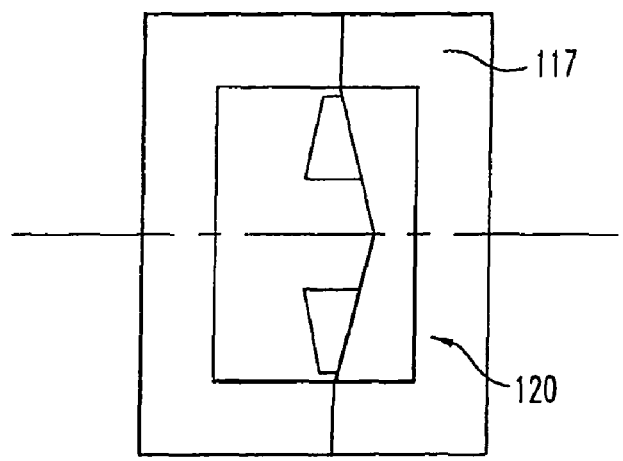

FIGS. 6a, 6b, and 6c depict another technique for making an embodiment of the impeller 62. In FIG. 6a, an impeller forged billet 110 and a backplate forged billet 112 are provided. The impeller forged billet 110 may be machined to provide a cone surface 114 and a pocket 116. The cone surface 114 may have any angle. The pocket 116 may be formed similar to any of the embodiments or variations of the cavities disclosed above. The backplate forged billet 112 may also be machined with a matching cone 118. The machined impeller forged billet 110 and the machined backplate forged billet 112 may then be coupled via diffusion bonding using any suitable tooling 117. Other techniques may also be used to join the impeller forged billet 110 with the backplate forged billet 112. In one embodiment, the tooling 117 may include TZM moly tooling. After the machined billets 112 and 114 are bonded to form a combination 120, the combination 120 may then be subjected to ultrasonic inspection to verify good bond quality. As a final step, the combination 120 may then be machined to a final impeller configuration having airfoils and a backplate.

One aspect of the present application includes a compressor impeller having a cavity formed opposite a pitch between blades on a front side of the impeller. The cavity may be closed with a cover that may be separately attached or integrally formed with the impeller. The cavity may have boundaries determined at least by the location of the impeller blades on the front side of the impeller as well as a stress criteria. The stress criteria may be determined by material selection and operational speed and temperature. In some forms the impeller may be formed from two different materials.

Another aspect of the present application includes a turbomachinery impeller having a first side and a second side arranged along an axis. The first side has a pair of blades and a pitch between the pair of blades. A cavity is located in the impeller within a region having a boundary defined by the pair of blades and opposite with at least a portion of the pitch.

Yet another aspect of the present application includes a gas turbine engine impeller hub having a front surface and a back surface and including at least two blades. The at least two blades define at least two root contours. A cavity is located toward the back surface of the gas turbine engine impeller and is confined within an area between the root contours.

Still another aspect of the present application includes a method of making an impeller. The method includes producing an impeller having a front side and a back side; forming blades in the front side of the impeller; identifying a root contour for each of the blades; and bounding a cavity in the back side of the impeller between the root contours.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
   a turbomachinery impeller having a first side and a second side, the first side having a pair of adjacent blades spaced circumferentially apart and a pitch between the pair of adjacent blades; and
   a cavity formed in the turbomachinery impeller within a region having a boundary defined by the pair of adjacent blades and opposite with at least a portion of the pitch, the cavity restricted to the region.

2. The apparatus of claim 1 wherein the turbomachinery impeller is a centrifugal compressor impeller.

3. The apparatus of claim 1 which further includes a pair of ribs disposed on the second side opposite with the pair of blades on the first side.

4. The apparatus of claim 3 wherein the pair of ribs further includes an opening.

5. The apparatus of claim 1 which further includes a cover enclosing at least a portion of the cavity.

6. The apparatus of claim 5 wherein the cover is integrally cast with the impeller.

7. The apparatus of claim 1 wherein the cavity is in fluid communication with an exterior of the impeller.

8. The apparatus of claim 1 which further includes a filler material at least partially filling the cavity.

9. An apparatus comprising:
   a gas turbine engine impeller having a front surface and a back surface and including at least two blades, the at least two blades defining at least two root contours;
   a cavity located toward the back surface of the gas turbine engine impeller, the cavity confined within an area between the at least two root contours; and
   a rib formed in the back surface of the gas turbine engine impeller and oriented to follow one of the at least two root contours.

10. The apparatus of claim 9 which further includes a cover enclosing the cavity.

11. The apparatus of claim 10 wherein the cover is diffusion bonded to the gas turbine engine impeller.

12. The apparatus of claim 9 wherein the gas turbine engine impeller includes a tip ring coupled with a gas turbine engine impeller hub, the tip ring having at least two tip blades coupled with at least two blades of the gas turbine engine impeller hub.

13. The apparatus of claim 12 wherein the tip ring and the gas turbine engine impeller hub are made of different materials.

14. The apparatus of claim 13 wherein the tip ring and the hub are attached by diffusion bonding.

15. A method of manufacture comprising:
   producing an impeller having a front side and a back side;
   forming blades in the front side of the impeller;
   identifying a root contour for each of the blades; and
   bounding a cavity in the back side of the impeller between the root contours.

16. The method of claim 15 wherein the producing includes enclosing the back side with a cover.

17. The method of claim 16 wherein the enclosing includes the step of diffusion bonding.

18. The method of claim 15 which further includes:
   defining the operational characteristics of the impeller, including a target rotational velocity, a material type, and an operating stress;
   determining a boundary of the cavity by solving the equation $s=(\rho \cdot r^2 \cdot \omega^2)/386.4$ for radius, where s is an operating stress value, $\rho$ is density, r is the radius to be determined, and $\omega$ is a target rotational velocity value.

19. The method of claim 15 wherein producing the impeller includes joining together a tip ring and a hub ring, wherein the tip ring includes a plurality of blades.

20. The method of claim 19 wherein joining the tip ring and the hub includes diffusion bonding.

21. The method of claim 20 wherein the diffusion bonding is achieved through a differential thermal expansion approach using TZM moly backup rings.

22. The method of claim 15 which further includes configuring a conduit in the impeller that is structured to flow a fluid from the cavity to an exterior side of the impeller.

* * * * *